United States Patent
Disser et al.

(10) Patent No.: US 7,402,969 B2
(45) Date of Patent: Jul. 22, 2008

(54) METHOD FOR PRODUCING VOLTAGE WAVEFORMS IN A PWM MOTOR CONTROLLER OF A PM DC BRUSHLESS MOTOR

(75) Inventors: Robert J. Disser, Dayton, OH (US); Monty L. Crabill, New Carlisle, OH (US)

(73) Assignee: Delphi Technologies, Inc, Troy, MI (US)

( * ) Notice: Subject to any disclaimer, the term of this patent is extended or adjusted under 35 U.S.C. 154(b) by 0 days.

(21) Appl. No.: 11/387,578

(22) Filed: Mar. 23, 2006

(65) Prior Publication Data

US 2007/0222403 A1 Sep. 27, 2007

(51) Int. Cl.
*H02P 6/14* (2006.01)

(52) U.S. Cl. .............. 318/400.13; 318/400.14; 318/400.27

(58) Field of Classification Search .......... 318/138, 318/254, 439, 700–724, 400.13, 400.14, 318/400.26, 400.27, 400.29
See application file for complete search history.

(56) References Cited

U.S. PATENT DOCUMENTS

| | | | | | |
|---|---|---|---|---|---|
| 3,783,359 | A | * | 1/1974 | Malkiel | 318/400.09 |
| 4,511,827 | A | * | 4/1985 | Morinaga et al. | 318/254 |
| 4,514,667 | A | * | 4/1985 | Sakmann et al. | 318/254 |
| 5,041,768 | A | * | 8/1991 | Herrmann | 318/138 |
| 5,168,202 | A | * | 12/1992 | Bradshaw et al. | 318/608 |
| 5,200,675 | A | * | 4/1993 | Woo | 318/254 |
| 5,373,436 | A | | 12/1994 | Yamaguchi et al. | |
| 5,764,020 | A | * | 6/1998 | Maiocchi | 318/705 |
| 6,014,004 | A | * | 1/2000 | Hamaoka et al. | 318/778 |
| 6,262,544 | B1 | | 7/2001 | Disser et al. | |
| 6,384,553 | B1 | * | 5/2002 | Liu | 318/139 |
| 6,424,798 | B1 | | 7/2002 | Kitamine | |
| 6,534,938 | B1 | | 3/2003 | Wu et al. | |
| 6,577,087 | B2 | * | 6/2003 | Su | 318/254 |
| 6,580,236 | B2 | | 6/2003 | Mitsuda | |
| 6,605,912 | B1 | * | 8/2003 | Bharadwaj et al. | 318/400.09 |
| 6,771,035 | B2 | * | 8/2004 | Heidrich | 318/254 |
| 6,775,164 | B2 | | 8/2004 | Wong et al. | |
| 6,809,484 | B2 | * | 10/2004 | Makaran et al. | 318/34 |
| 2002/0027423 | A1 | | 3/2002 | White | |
| 2004/0108789 | A1 | | 6/2004 | Marshall | |

* cited by examiner

*Primary Examiner*—Bentsu Ro
(74) *Attorney, Agent, or Firm*—Scott A. McBain

(57) ABSTRACT

A method produces PWM voltage waveforms in a PWM motor controller of a three phase PM DC brushless motor, wherein the motor controller has first, second and third half H-bridge transistor pairs to generate the voltage waveforms to electronically commutate the motor. The first transistor pair is always assigned to the first phase for every commutation state requiring a voltage waveform from the first transistor pair. The second and third transistor pair are similarly assigned. The first method also includes always starting a voltage waveform generated by the first transistor pair substantially at the beginning of the PWM period when a commutation state requires a voltage waveform from the first transistor pair but delaying starting a voltage waveform generated by the second transistor pair by substantially ⅓ of the PWM period and delaying starting a voltage waveform generated by the third transistor pair by substantially ⅔ of the PWM period.

22 Claims, 5 Drawing Sheets

METHOD FOR PRODUCING VOLTAGE WAVEFORMS IN A PWM MOTOR CONTROLLER OF A PM DC BRUSHLESS MOTOR

TECHNICAL FIELD

The present invention relates generally to PWM motor control of PM DC brushless motors, and more particularly to a method for producing PWM voltage waveforms in a PWM motor controller of a PM DC brushless motor.

BACKGROUND OF THE INVENTION

A first conventional method for operation of a PM DC brushless motor in all four quadrants of the motor torque versus motor speed diagram produces PWM voltage waveforms in a PWM motor controller wherein first, second and third half H-bridge transistor pairs conduct two at a time to generate waveforms to electronically commutate the motor. To produce a PWM duty cycle between 0% duty cycle and 100% duty cycle, the first conducting transistor pair is controlled with a PWM duty cycle equal to the desired duty cycle (DC) while the second conducting transistor pair is controlled such that either the upper transistor or the lower transistor conducts continuously. Current sensing for this implementation is accomplished using a current sensing element in series with at least 2 of the 3 half H-bridge motor outputs. This method requires multiple current sensing elements exposed to the PWM outputs of a PWM motor controller which adds cost and complexity to the motor controller.

A second conventional method for operation of a PM DC brushless motor in all four quadrants of the motor torque versus motor speed diagram produces PWM voltage waveforms in a PWM motor controller, shown in FIG. 1, wherein first, second and third half H-bridge transistor pairs conduct two at a time to generate voltage waveforms to electronically commutate the motor. There are six rotationally sequential commutation states, labeled left to right, wherein 101 denotes the first commutation state, 100 denotes the second commutation state, etc. The voltage waveforms applied to the windings of the first phase (arbitrarily labeled phase A), the second phase (arbitrarily labeled phase B), and the third phase (arbitrarily labeled phase C) are shown, wherein a particular transistor pair is assigned to a particular phase for a particular commutation state. Note that for each commutation state, one of the two voltage waveforms starts at the beginning of the PWM period and the other of the two voltage waveforms is delayed by ½ of the PWM period. A more detailed explanation of the operation of FIG. 1 is given below.

In this conventional method, the motor controller uses a single current sensing element in the DC bus and requires a minimum duty cycle for motor current sensing in order to properly sample the motor current. To produce a PWM duty cycle between the minimum duty cycle and 100% duty cycle, the first conducting transistor pair is controlled with a PWM duty cycle equal to the desired duty cycle (DC), which is greater than the minimum duty cycle, while the second conducting transistor pair is controlled such that either the upper transistor or the lower transistor conducts continuously. To produce a PWM duty cycle between 0% and the minimum duty cycle, both conducting transistor pairs must operate in a PWM mode. In this condition, the first conducting transistor pair is controlled with a PWM duty cycle equal to the minimum duty cycle plus the desired duty cycle (DCmin+DC) while the second conducting transistor pair is controlled with a PWM duty cycle equal to the minimum duty cycle (DCmin).

It is noted that the widths of the waveforms in FIG. 1 are not drawn to scale. Under this condition the correct motor windings are effectively provided a positive voltage by the first conducting transistor pair and a negative voltage by the second conducting transistor pair during a single PWM period such that the sum of the voltages is equal to the desired duty cycle (DCmin+DC−DCmin=DC) which is effectively less than the minimum duty cycle (DCmin). In this implementation, the PWM duty cycle of the second conducting transistor pair is delayed from the first conducting transistor pair by a time equal to ½ of the PWM period. This allows the motor winding to average the applied positive and negative voltages and provides a symmetrical current waveform. This implementation requires the control electronics to reassign the PWM duty cycle delay for the second conducting transistor pair for each commutation of the motor windings. Some hardware or software implementations either cannot accommodate this reassignment or the accommodation is very difficult.

FIG. 1 illustrates a single PWM cycle timing of each of the 6 PM DC brushless motor commutation states for the conventional implementation. Under normal operating conditions, each of the 6 commutation states will contain repeated PWM periods. The number of repeated PWM periods will depend upon the rotational velocity of the motor. The 6 motor commutation states are represented by the binary combinations of 3 motor position sensor inputs and are defined as State 101, State 100, State 110, State 010, State 011, and State 001. A seventh state is shown at the right-most end of FIG. 1 which is a repeat of the left-most State 101.

Beginning with the left-most State 101, the conducting transistor Pair 1 is Phase A, and the conducting transistor Pair 2 is Phase B. The PWM duty cycle output on Phase A is the minimum duty cycle plus the requested duty cycle (DCmin+DC), and this occurs at the beginning of the PWM period. The PWM duty cycle output on Phase B is the minimum duty cycle (DCmin), and this output is delayed for ½ of the PWM period. The motor current is flowing in motor windings Phase A and Phase B in such a manner that the current flows from Phase A to Phase B.

At the first motor commutation time, the motor commutation state transitions to State 100. The conducting transistor Pair 1 remains Phase A, but the conducting transistor Pair 2 transitions to Phase C. The PWM duty cycle output on Phase A remains (DCmin+DC) at the beginning of the PWM period. The PWM duty cycle output on Phase C transitions to the minimum duty cycle (DCmin), and the output is delayed for ½ of the PWM period. The previous output on Phase C has not yet been discussed, but Phase C was last enabled in a previous State 001. During State 001, Phase C was set up as a conducting transistor Pair 1 with the output of (DCmin+DC) at the beginning of a PWM period. The transition to State 100 required Phase C to transition from a conducting transistor Pair 1 to a conducting transistor Pair 2. This transition required a PWM timing change for the Phase C PWM driver. The motor current is flowing in motor windings Phase A and Phase C in such a manner that the current flows from Phase A to Phase C.

At the second motor commutation time, the motor commutation state transitions to State 110. The conducting transistor Pair 2 remains Phase C, but the conducting transistor Pair 1 transitions to Phase B. The PWM duty cycle output on Phase C remains (DCmin) delayed for ½ of the PWM period. The PWM duty cycle on Phase B transitions to (DCmin+DC), and the output starts at the beginning of the PWM period. Phase B was last enabled in State 101 as a conducting transistor Pair 2 with the output of (DCmin) delayed for ½ of the PWM period. The transition to State 110 required Phase B to transition from a conducting transistor Pair 2 to a conducting transistor Pair 1. This transition required a PWM timing change for the Phase B PWM driver. The motor current is flowing in motor windings Phase B and Phase C in such a manner that the current flows from Phase B to Phase C.

At the third motor commutation time, the motor commutation state transitions to State 010. The conducting transistor Pair 1 remains Phase B, but the conducting transistor Pair 2 transitions to Phase A. The PWM duty cycle output on Phase B remains (DCmin+DC) at the beginning of the PWM period. The PWM duty cycle on Phase A transitions to (DCmin), and the output is delayed by ½ of the PWM period. Phase A was last enabled in State 100 as a conducting transistor Pair 1 with the output of (DCmin+DC) and the output at the beginning of the PWM period. The transition to State 010 required Phase A to transition from a conducting transistor Pair 1 to a conducting transistor Pair 2. This transition required a PWM timing change for the Phase A PWM driver. The motor current is flowing in motor windings Phase B and Phase A in such a manner that the current flows from Phase B to Phase A.

At the fourth motor commutation time, the motor commutation state transitions to State 011. The conducting transistor Pair 2 remains Phase A, but the conducting transistor Pair 1 transitions to Phase C. The PWM duty cycle output on Phase A remains (DCmin) delayed for ½ of the PWM period. The PWM duty cycle output on Phase C transitions to (DCmin+DC) at the beginning of the PWM period. Phase C was last enabled in State 110 as a conducting transistor Pair 2 with the output of (DCmin) and the output delayed by ½ of the PWM period. The transition to State 011 required Phase C to transition from a conducting transistor Pair 2 to a conducting transistor Pair 1. This transition required a PWM timing change for the Phase C PWM driver. The motor current is flowing in the motor windings Phase A and Phase C in such a manner that the current flows from Phase C to Phase A.

At the fifth motor commutation time, the motor commutation state transitions to State 001. The conducting transistor Pair 1 remains Phase C, but the conducting transistor Pair 2 transitions to Phase B. The PWM duty cycle output on Phase C remains (DCmin+DC) at the beginning of the PWM period. The PWM duty cycle output on Phase B transitions to (DCmin), and the output is delayed by ½ of the PWM period. Phase B was last enabled in State 010 as a conducting transistor Pair 1 with the output of (DCmin+DC) and the output at the beginning of the PWM period. The transition to State 001 required Phase B to transition from a conducting transistor Pair 1 to a conducting transistor Pair 2. This transition required a PWM timing change for the Phase B PWM driver. The motor current is flowing n motor windings Phase C and Phase B in such a manner that the current flows from Phase C to Phase B.

What is needed is an improved method for producing PWM voltage waveforms in a PWM motor controller of a PM DC brushless motor, such as, without limitation, a PWM motor controller of a PM DC brushless motor which uses a single current sensing element in the DC bus without requiring a PWM timing change of the PWM driver.

SUMMARY OF THE INVENTION

A first method of the invention is for producing PWM voltage waveforms in a PWM motor controller of a PM DC brushless motor, wherein the voltage waveforms have a PWM period, wherein the motor has commutation states and first, second and third phases, and wherein the motor controller has first, second and third half H-bridge transistor pairs to generate the voltage waveforms to electronically commutate the motor. The first method includes always assigning the first transistor pair to the first phase for every commutation state requiring a voltage waveform from the first transistor pair. The first method also includes always assigning the second transistor pair to the second phase for every commutation state requiring a voltage waveform from the second transistor pair. The first method also includes always assigning the third transistor pair to the third phase for every commutation state requiring a voltage waveform from the third transistor pair. The first method also includes always starting a voltage waveform generated by the first transistor pair substantially at the beginning of the PWM period when a commutation state requires a voltage waveform from the first transistor pair. The first method also includes always delaying starting a voltage waveform generated by the second transistor pair by substantially ⅓ of the PWM period when a commutation state requires a voltage waveform from the second transistor pair. The first method also includes always delaying starting a voltage waveform generated by the third transistor pair by substantially ⅔ of the PWM period when a commutation state requires a voltage waveform from the third transistor pair.

Several benefits and advantages are derived from the first method of the invention. In one example, the first method allows lower cost electronic hardware to control the motor by using a single current sensing element and eliminating the prior art need to reassign the PWM duty cycle delay of the voltage waveform generated by a transistor pair when the motor control implementation requires a combined duty cycle from two transistor pairs less than a predetermined minimum duty cycle needed for motor current sensing to properly sample the motor current. In the same or a different example, the first method allows motor operation in all four quadrants of the motor torque versus motor speed diagram.

DETAILED DESCRIPTION

Figure 1:
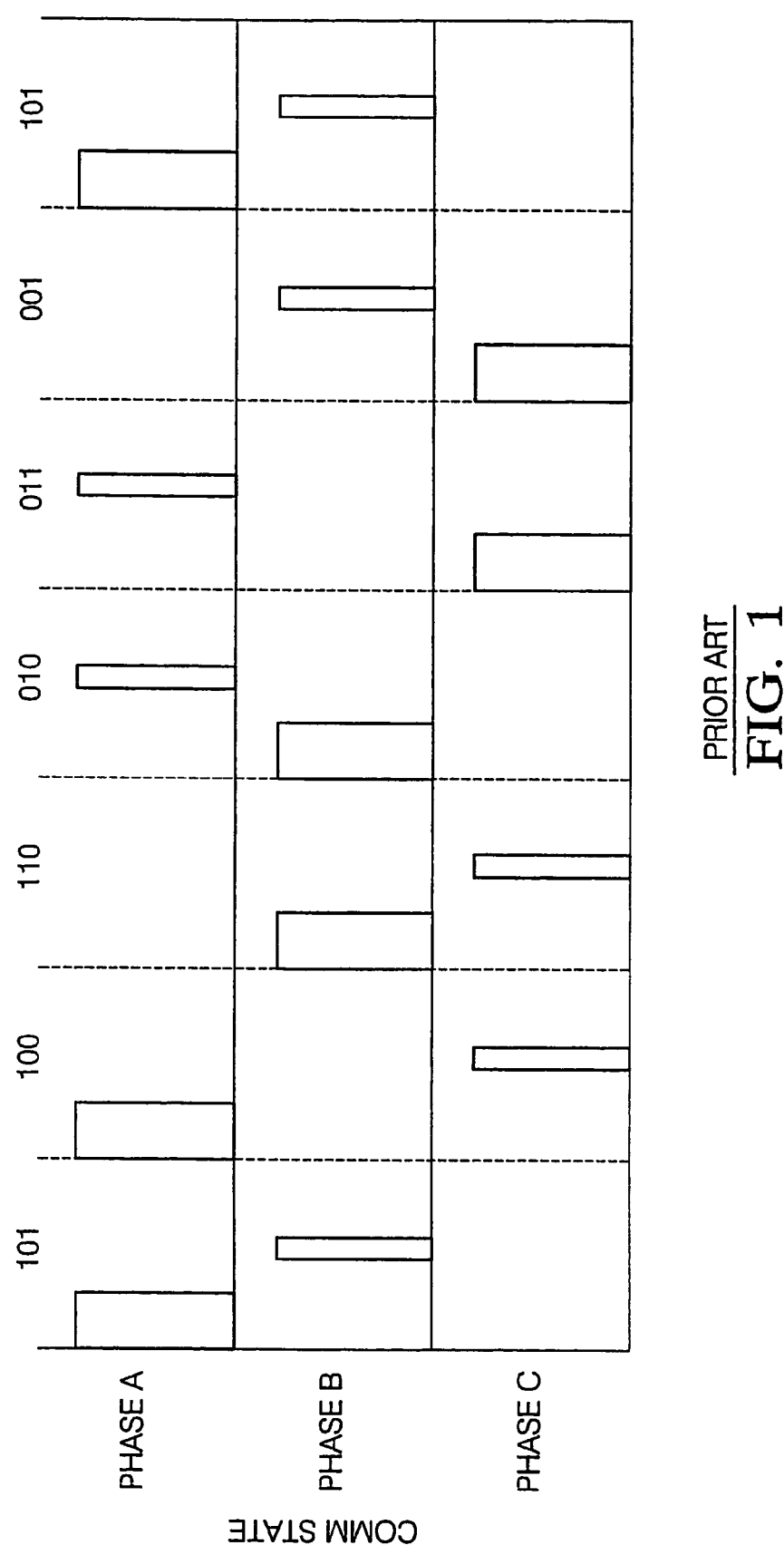
FIG. 1 is a diagram of the voltage waveforms for the six different commutation states in a prior art PWM motor control of a three-phase PM DC brushless motor.
Figure 2:
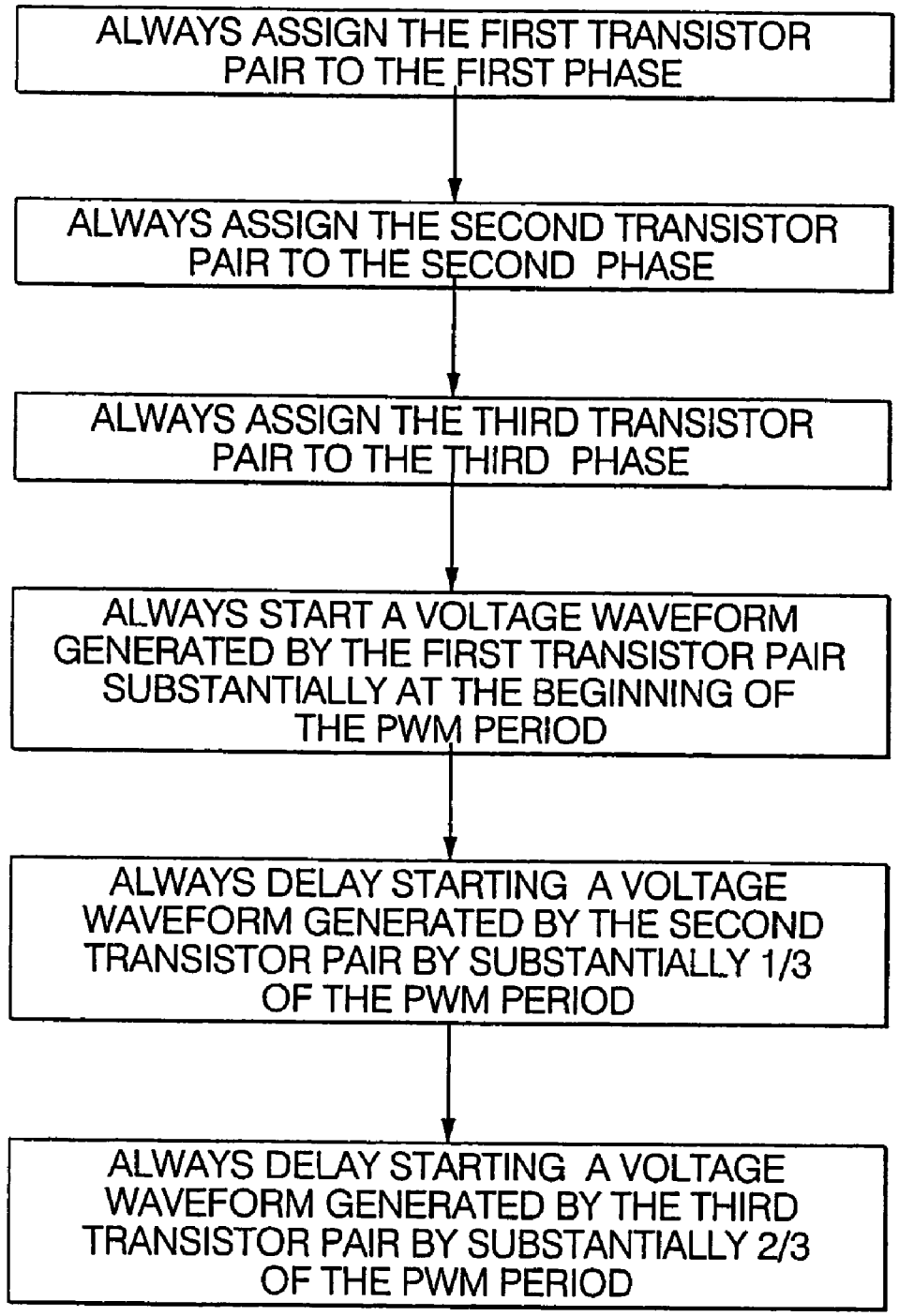
FIG. 2 is a block diagram of a first method of the invention.

Referring to FIGS. 2-5, a first method of the invention (shown in FIG. 2) is for producing PWM voltage waveforms 10, 12 and 14 (shown in FIG. 3) in a PWM motor controller 16 of a PM DC brushless motor 18 (shown in FIG. 5), wherein the voltage waveforms 10, 12 and 14 have a PWM period, wherein the motor 18 has commutation states and first, second and third phases (arbitrarily labeled phase A, phase B and phase C in FIGS. 3-5), and wherein the motor controller 16 has first, second and third half H-bridge transistor pairs 20, 22 and 24 (shown in FIG. 4) to generate the voltage waveforms 10, 12 and 14 to electronically commutate the motor 18. The first method includes always assigning the first transistor pair 20 to the first phase for every commutation state requiring a voltage waveform 10 from the first transistor pair 20. The first method also includes always assigning the second transistor pair 22 to the second phase for every commutation state requiring a voltage waveform 12 from the second transistor pair 22. The first method also includes always assigning the third transistor pair 24 to the third phase for every commutation state requiring a voltage waveform 14 from the third transistor pair 24. The first method also includes always starting a voltage waveform 10 generated by the first transistor pair 20 substantially at the beginning of the PWM period when a commutation state requires a voltage waveform 10 from the first transistor pair 20. The first method also includes always delaying starting a voltage waveform 12 generated by the second transistor pair 22 by substantially ⅓ of the PWM period when a commutation state requires a voltage waveform 12 from the second transistor pair 22. The first method also includes always delaying starting a voltage waveform 14 generated by the third transistor pair 24 by substantially ⅔ of the PWM period when a commutation state requires a voltage waveform 14 from the third transistor pair 24.

In one application of the first method, the PWM motor controller requires a minimum duty cycle for motor current sensing in order to properly sample the motor current. In a first example, to produce a PWM duty cycle between the minimum duty cycle and a 100% duty cycle, each commutation state requires exactly two of the first, second, and third transistor pairs 20, 22, and 24 to conduct in a manner such that one transistor pair is controlled with a PWM duty cycle equal to the desired duty cycle (DC) while another transistor pair is controlled such that either the upper transistor or the lower transistor conducts continuously. In the first example, each voltage waveform has a duty cycle which can be adjusted from a first duty cycle equal to a desired duty cycle and a second duty cycle equal to a 100% duty cycle, and wherein the desired duty cycle is greater than a predetermined duty cycle required for the motor controller to sample current in the motor. In a second example, to produce a PWM duty cycle less than the minimum duty cycle each commutation state requires voltage waveforms 10, 12 and 14 from exactly two of the first, second and third transistor pairs 20, 22 and 24. In one variation, each voltage waveform 10, 12 and 14 has a duty cycle which can be adjusted from a first duty cycle equal to a predetermined minimum duty cycle (e.g., the narrower waveforms shown in FIG. 3) required for the motor controller to sample current in the motor and a second duty cycle equal to the predetermined minimum duty cycle plus a desired duty cycle (e.g., the wider waveforms shown in FIG. 3). The desired duty cycle is less than the predetermined minimum duty cycle. It is noted that the widths of the waveforms in FIG. 1 are not drawn to scale.

Figure 5:
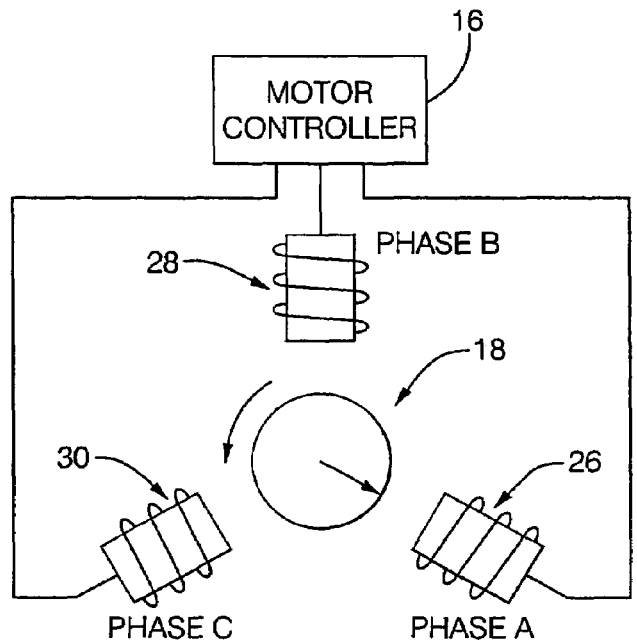
FIG. 5 is a schematic representation of an example of a motor controller containing the three transistor pairs of FIG. 4 and operating to produce the voltage waveforms of FIG. 3 in accordance with the first method of FIG. 2, wherein the motor controller is shown with connections to the phase windings of the motor.

In one employment of the first method, the commutation states consist of rotationally sequential first, second, third, fourth, fifth and sixth commutation states. The motor 18 has a first winding 26 for the first phase, a second winding 28 for the second phase and a third winding 30 for the third phase as shown in FIG. 5. It is noted that in FIG. 5, the first phase is arbitrarily labeled phase A, the second phase is arbitrarily labeled phase B, and the third phase is arbitrarily labeled phase C. For the first commutation state (labeled 101 at the left side in FIG. 3) the first transistor pair 20 has a duty cycle equal to the second duty cycle, the second transistor pair 22 has a duty cycle equal to the first duty cycle, the voltage waveform 10 from the first transistor pair 20 is applied to the first winding 26 and the voltage waveform 12 from the second transistor pair 22 is applied, opposite in sign, to the second winding 28. Current flows from the first winding 26 to the second winding 28.

In the same or a different employment, for the second commutation state (labeled 100 in FIG. 3) the first transistor pair 20 has a duty cycle equal to the second duty cycle, the third transistor pair 24 has a duty cycle equal to the first duty cycle, the voltage waveform 10 from the first transistor pair 20 is applied to the first winding 26 and the voltage waveform 14 from the third transistor pair 24 is applied, opposite in sign, to the third winding 30. Current flows from the first winding 26 to the third winding 30.

In the same or a different employment, for the third commutation state (labeled 110 in FIG. 3) the second transistor pair 22 has a duty cycle equal to the second duty cycle, the third transistor pair 24 has a duty cycle equal to the first duty cycle, the voltage waveform 12 from the second transistor pair 22 is applied to the second winding 28 and the voltage waveform 14 from the third transistor pair 24 is applied, opposite in sign, to the third winding 30. Current flows from the second winding 28 to the third winding 30.

In the same or a different employment, for the fourth commutation state (labeled 010 in FIG. 3) the second transistor pair 22 has a duty cycle equal to the second duty cycle, the first transistor pair 20 has a duty cycle equal to the first duty cycle, the voltage waveform 12 from the second transistor pair 22 is applied to the second winding 28 and the voltage waveform 10 from the first transistor pair 20 is applied, opposite in sign, to the first winding 26. Current flows from the second winding 28 to the first winding 26.

In the same or a different employment, for the fifth commutation state (labeled 011 in FIG. 3) the third transistor pair 24 has a duty cycle equal to the second duty cycle, the first transistor pair 20 has a duty cycle equal to the first duty cycle, the voltage waveform 14 from the third transistor pair 24 is applied to the third winding 30 and the voltage waveform 10 from the first transistor pair 20 is applied, opposite in sign, to the first winding 26. Current flows from the third winding 30 to the first winding 26.

In the same or a different employment, for the sixth commutation state (labeled 001 in FIG. 3) the third transistor pair 24 has a duty cycle equal to the second duty cycle, the second transistor pair 22 has a duty cycle equal to the first duty cycle, the voltage waveform 14 from the third transistor pair 24 is applied to the third winding 30 and the voltage waveform 12 from the second transistor pair 22 is applied, opposite in sign, to the second winding 28. Current flows from the third winding 30 to the second winding 28.

A second method of the invention is for producing PWM voltage waveforms 10, 12 and 14 (shown in FIG. 3) in a PWM motor controller 16 of a PM DC brushless motor 18 (shown in FIG. 5), wherein the voltage waveforms 10, 12 and 14 have a PWM period, wherein the motor 18 has commutation states and first, second and third phases (arbitrarily labeled phase A, phase B and phase C in FIGS. 3-5), and wherein the motor controller 16 has first, second and third half H-bridge transistor pairs 20, 22 and 24 (shown in FIG. 4) to generate the voltage waveforms 10, 12 and 14 to electronically commutate the motor 18. The second method includes always assigning the first transistor pair 20 to the first phase for every commutation state requiring a voltage waveform 10 from the first transistor pair 20. The second method also includes always assigning the second transistor pair 22 to the second phase for every commutation state requiring a voltage waveform 12 from the second transistor pair 22. The second method also includes always assigning the third transistor pair 24 to the third phase for every commutation state requiring a voltage waveform 14 from the third transistor pair 24. The second method also includes always starting a voltage waveform 10 generated by the first transistor pair 20 substantially at the beginning of the PWM period when a commutation state requires a voltage waveform 10 from the first transistor pair 20. The second method also includes always delaying starting a voltage waveform 12 generated by the second transistor pair 22 by substantially ⅓ of the PWM period when a commutation state requires a voltage waveform 12 from the second transistor pair 22. The second method also includes always delaying starting a voltage waveform 14 generated by the third transistor pair 24 by substantially ⅔ of the PWM period when a commutation state requires a voltage waveform 14 from the third transistor pair. The second method also includes operating the motor 18 in all four quadrants of a motor torque versus motor speed diagram.

It is noted that the applications and employments of the first method are equally applicable to the second method.

A third method of the invention is for producing PWM voltage waveforms 10, 12 and 14 (shown in FIG. 3) in a PWM motor controller 16 of a PM DC brushless motor 18 (shown in FIG. 5), wherein the voltage waveforms 10, 12 and 14 have a PWM period, wherein the motor 18 has commutation states and first, second and third phases (arbitrarily labeled phase A, phase B and phase C in FIGS. 3-5), and wherein the motor controller 16 has first, second and third half H-bridge transistor pairs 20, 22 and 24 (shown in FIG. 4) to generate the voltage waveforms 10, 12 and 14 to electronically commutate the motor 18. The third method includes always assigning the first transistor pair 20 to the first phase for every commutation state requiring a voltage waveform 10 from the first transistor pair 20. The third method also includes always assigning the second transistor pair 22 to the second phase for every commutation state requiring a voltage waveform 12 from the second transistor pair 22. The third method also includes always assigning the third transistor pair 24 to the third phase for every commutation state requiring a voltage waveform 14 from the third transistor pair 24. The third method also includes always starting a voltage waveform 10 generated by the first transistor pair 20 substantially at the beginning of the PWM period when a commutation state requires a voltage waveform 10 from the first transistor pair 20. The third method also includes always delaying starting a voltage waveform 12 generated by the second transistor pair 22 by substantially ⅓ of the PWM period when a commutation state requires a voltage waveform 12 from the second transistor pair 22. The third method also includes always delaying starting a voltage waveform 14 generated by the third transistor pair 24 by substantially ⅔ of the PWM period when a commutation state requires a voltage waveform 14 from the third transistor pair. The third method also includes operating the motor 18 in all four quadrants of a motor torque versus motor speed diagram. In the third method, each commutation state requires voltage waveforms 10, 12 and 14 from exactly two of the first, second and third transistor pairs 20, 22 and 24. In the third method, each voltage waveform 10, 12 and 14 has a duty cycle which can be adjusted from a first duty cycle equal to a predetermined minimum duty cycle required for the motor controller 16 to sample current in the motor 18 and a second duty cycle equal to the predetermined minimum duty cycle plus a desired duty cycle. The desired duty cycle is less than the predetermined minimum duty cycle. In the third method for each commutation state, the voltage waveform of one of the two transistor pairs has a duty cycle equal to the second duty cycle and the other of the two transistor pairs has a duty cycle equal to the first duty cycle.

In one enablement of the third method, the motor 18 has a windings 26, 28 and 30 for each phase, wherein the voltage waveform of the one transistor pair is applied to one winding when a commutation state requires a voltage waveform from the one transistor pair, wherein the voltage waveform of the other transistor pair is applied, opposite in sign, to an other winding when a commutation state requires a voltage waveform from the other transistor pair, and wherein current flows from the one winding to the other winding.

A more detailed explanation of one example of the first, second and/or third method is given below wherein the motor 18 is described as a pulse-width-modulated PM DC brushless motor and wherein the first, second and third transistor pairs 20, 22 and 24 receive PWM control signals to produce the voltage waveforms 10, 12 and 14.

Figure 6A:
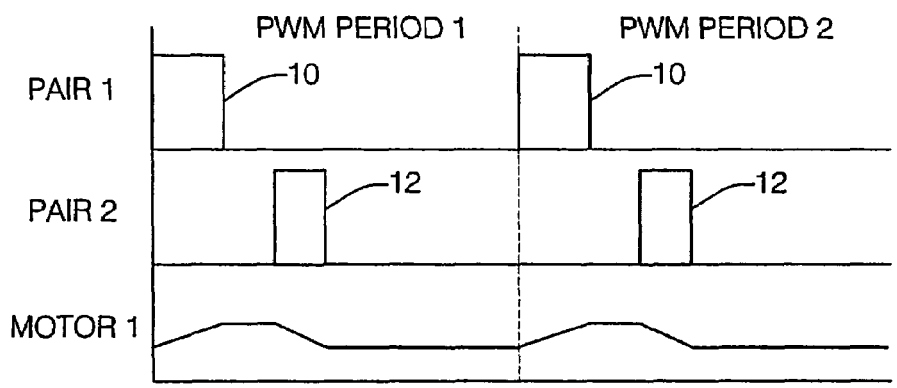
FIG. 6 illustrates a PWM duty cycle timing and motor current waveform for one example of the first method of FIG. 2.
Figure 6B:
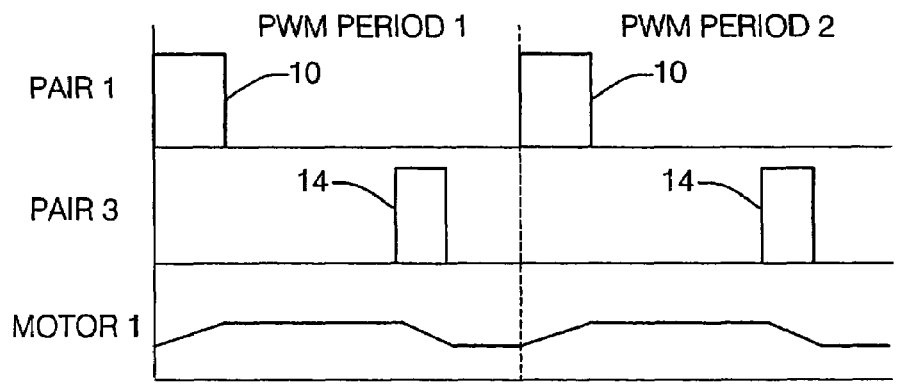

FIG. 6 illustrates the PWM duty cycle timing and motor current waveform for one example of the first method. The top graph of FIG. 6 illustrates, for the first commutation state 101 of FIG. 3, the voltage waveforms 10 and 12 produced by the first transistor pair 20 (labeled Pair 1) and the second transistor pair 22 (labeled Pair 2) along with the resulting motor current (labeled Motor I). Two PWM periods are shown in this graph. In this graph, transistor Pair 1 is shown at the beginning of the PWM period while transistor Pair 2 is shown delayed by ⅓ of the PWM period. The bottom graph of FIG. 6 illustrates, for the second commutation state 100 of FIG. 3, the voltage waveforms 10 and 14 produced by the first transistor pair 20 (labeled Pair 1) and the third transistor pair 24 (labeled Pair 3) along with the resulting motor current (labeled Motor I). Two PWM periods are shown in this graph. In this graph, transistor Pair 1 is shown at the beginning of the PWM period while transistor Pair 3 is shown delayed by ⅔ of the PWM period. The terms transistor Pair 1, transistor Pair 2 and transistor Pair 3 will refer to the delay time within the PWM period. Each transistor Pair will always be assigned to a specific motor phase. For this explanation, transistor Pair 1 will be assigned to Phase A, transistor Pair 2 will be assigned to Phase B, and transistor Pair 3 will be assigned to Phase C. Each transistor Pair can provide a PWM duty cycle output of the minimum duty cycle plus the desired duty cycle (DCmin+DC) or a PWM duty cycle output of the minimum duty cycle (DCmin). In both graphs of FIG. 6, the motor current waveform is not symmetrical. The top graph has the motor current at the higher recirculation value for approximately ⅓ of the PWM period, and the bottom graph has the motor current at the higher recirculation value for approximately ⅔ of the PWM period. This should not present a significant problem in many applications because the motor torque caused by the current will be averaged by the inertia of the rotor. This will however cause a different average motor current for a given PWM duty cycle output. For the same duty cycle output, the lower graph of FIG. 6 will have a higher average current and therefore a higher average torque. For most applications, the outer control loop (i.e. motor position control, motor velocity control, or motor torque control) will adjust the requested PWM duty cycle to account for the difference in average torque output. Since transistor Pair 1 is assigned to Phase A and always begins at the beginning of the PWM period, the commutation transitions will not cause a change in the PWM timing of the Phase A PWM driver. Since transistor Pair 2 is assigned to Phase B and always has a delay of ⅓ of the PWM period, the commutation transitions will not cause a change in the PWM timing of the Phase B PWM driver. Since transistor Pair 3 is assigned to Phase C and always has a delay of ⅔ of the PWM period, the commutation transitions will not cause a change in the PWM timing of the Phase C PWM driver. The assignment of a specific transistor Pair number to a particular motor phase is somewhat arbitrary and the specific assignments defined here are for purposes of this explanation.

Figure 3:
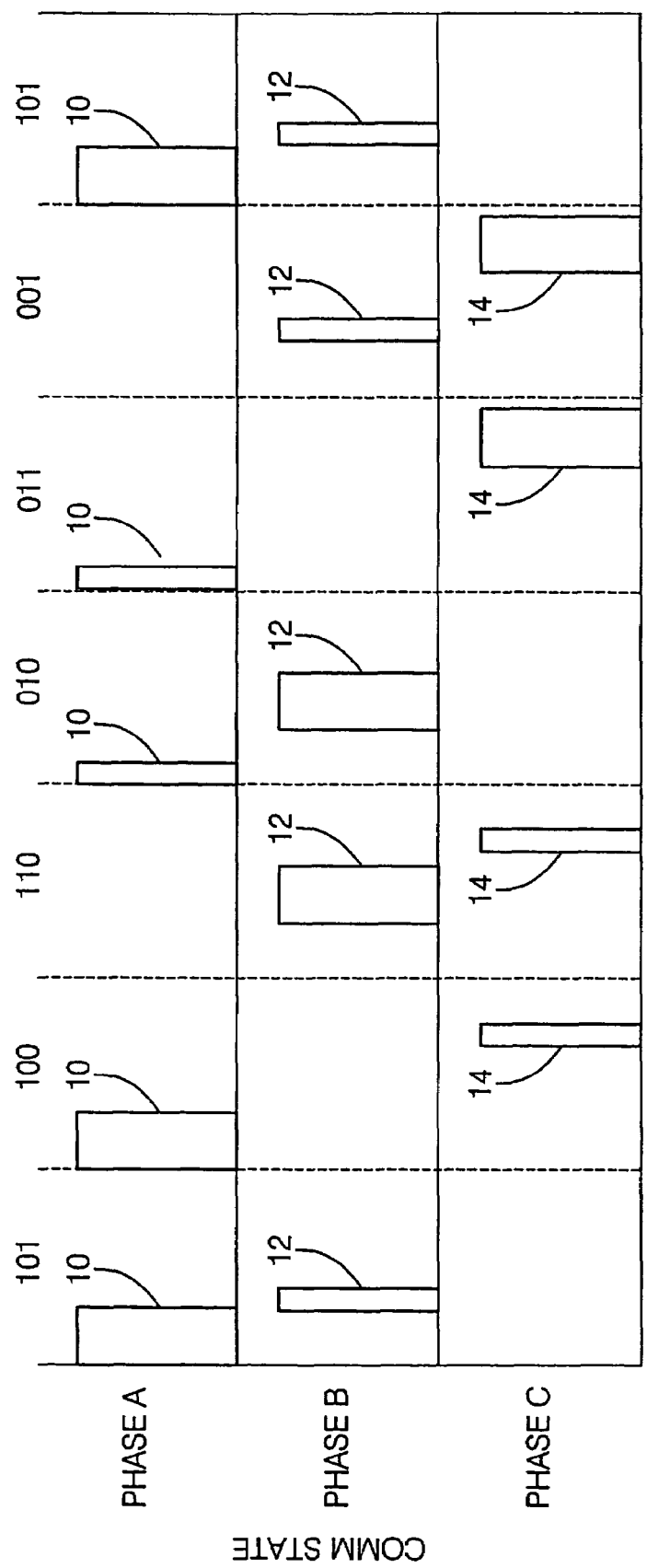
FIG. 3 is a diagram of the voltage waveforms for the commutation states in PWM motor control of a three phase PM DC brushless motor according to one example of the first method of FIG. 2.
Figure 4:
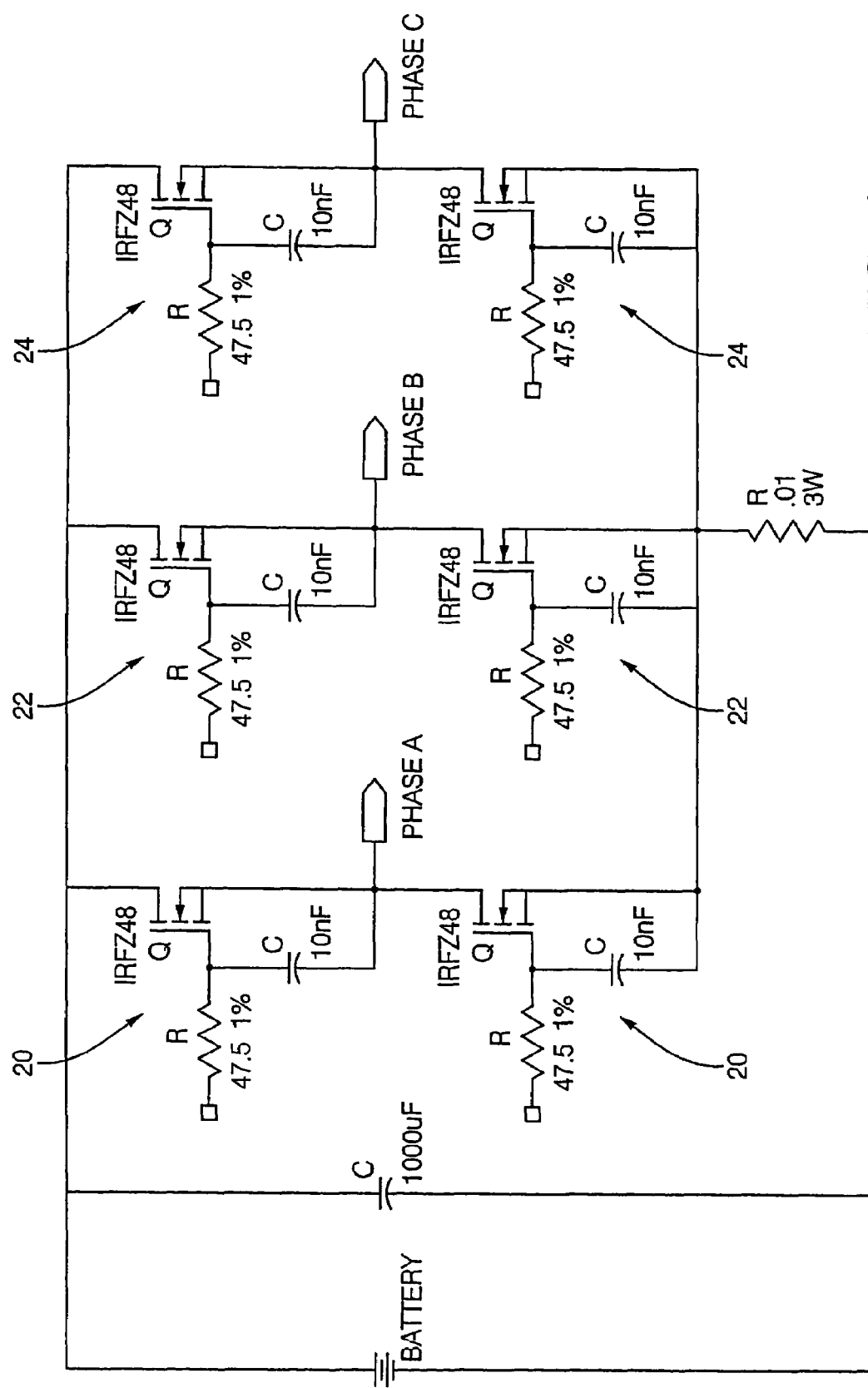
FIG. 4 is one example of a prior art circuit diagram of three transistor pairs used to generate the voltage waveforms for each of the phases of FIG. 3.

FIG. 3 illustrates a single PWM cycle timing of each of the 6 PM DC brushless motor commutation states for one implementation of the first method. Under normal operating conditions, each of the 6 commutation states will contain repeated PWM periods as represented in FIG. 6. The number of repeated PWM periods will depend upon the rotational velocity of the motor. The 6 motor commutation states are represent by the binary combinations of 3 motor position sensor inputs (not shown) and are defined as State 101, State 100, State 110, State 010, State 011, and State 001. A seventh state is shown at the right-most end of the figure which is a repeat of the left-most State 101.

Beginning with the left-most State 101, transistor Pair 1 is Phase A, and transistor Pair 2 is Phase B. The PWM duty cycle output on Phase A is the minimum duty cycle plus the requested duty cycle (DCmin+DC), and this occurs at the beginning of the PWM period. The PWM duty cycle output on Phase B is the minimum duty cycle (DCmin), and this output is delayed for ⅓ of the PWM period. The motor current is flowing in motor windings Phase A and Phase B in such a manner that the current flows from Phase A to Phase B.

At the first motor commutation time, the motor commutation state transitions to State 100. Transistor Pair 1 is Phase A, transistor Pair 2 turns off, and transistor Pair 3 is Phase C. The PWM duty cycle output on Phase A remains (DCmin+DC) at the beginning of the PWM period. The PWM duty cycle output on Phase C transitions to the minimum duty cycle (DCmin), and the output is delayed for ⅔ of the PWM period. The previous output on Phase C has not yet been discussed, but Phase C was last enabled in a previous State 001. During State 001, Phase C was set up with the output of (DCmin+DC) and with the output delayed by ⅔ of a PWM period. The transition to State 100 caused Phase C to change duty cycle but did not cause a PWM timing change for the Phase C PWM driver. The motor current is flowing in motor windings Phase A and Phase C in such a manner that the current flows from Phase A to Phase C.

At the second motor commutation time, the motor commutation state transitions to State 110. Transistor Pair 3 remains Phase C, transistor Pair 1 turns off, and transistor Pair 2 is Phase B. The PWM duty cycle output on Phase C remains (DCmin) delayed for ⅔ of the PWM period. The PWM duty cycle on Phase B transitions to (DCmin+DC), and the output is delayed by ⅓ of the PWM period. Phase B was last enabled in State 101 with the output of (DCmin) delayed for ⅓ of the PWM period. The transition to State 110 caused Phase B to change PWM duty cycle but did not cause a PWM timing change for the Phase B PWM driver. The motor current is flowing in motor windings Phase B and Phase C in such a manner that the current flows from Phase B to Phase C.

At the third motor commutation time, the motor commutation state transitions to State 010. Transistor Pair 2 remains Phase B, transistor Pair 3 turns off, and transistor Pair 1 is Phase A. The PWM duty cycle output on Phase B remains (DCmin+DC) and is delayed by ⅓ of the PWM period. The PWM duty cycle on Phase A transitions to (DCmin), and the output is at the beginning of the PWM period. Phase A was last enabled in State 100 with the output of (DCmin+DC) and the output at the beginning of the PWM period. The transition to State 010 caused Phase A to change PWM duty cycle but did not cause a PWM timing change for the Phase A PWM driver. The motor current is flowing in motor windings Phase B and Phase A in such a manner that the current flows from Phase B to Phase A.

At the fourth motor commutation time, the motor commutation state transitions to State 011. Transistor Pair 1 remains Phase A, transistor Pair 2 turns off, and transistor Pair 3 is Phase C. The PWM duty cycle output on Phase A remains (DCmin) at the beginning of the PWM period. The PWM duty cycle output on Phase C transitions to (DCmin+DC) delayed by ⅔ of the PWM period. Phase C was last enabled in State 110 with the output of (DCmin) and the output delayed by ⅔ of the PWM period. The transition to State 011 caused Phase C to change PWM duty cycles but did not cause a PWM timing change for the Phase C PWM driver. The motor current is flowing in the motor windings Phase C and Phase A in such a manner that the current flows from Phase C to Phase A.

At the fifth motor commutation time, the motor commutation state transitions to State 001. Transistor Pair 3 remains Phase C, transistor Pair 1 turns off, and transistor Pair 2 is Phase B. The PWM duty cycle output on Phase C remains (DCmin+DC) and is delayed by ⅔ of the PWM period. The PWM duty cycle output on Phase B transitions to (DCmin), and the output is delayed by ⅓ of the PWM period. Phase B was last enabled in State 010 with the output of (DCmin+DC) and with the output delayed by ⅓ of the PWM period. The transition to State 001 caused Phase B to change PWM duty cycle but did not cause a PWM timing change for the Phase B PWM driver. The motor current is flowing in motor windings Phase C and Phase B in such a manner that the current flows from Phase C to Phase B.

Several benefits and advantages are derived from the first, second and/or third method of the invention. In one example, lower cost electronic hardware can be used to control the motor by eliminating the prior art need to reassign the PWM duty cycle delay of the voltage waveform generated by a transistor pair when the motor control implementation requires a combined duty cycle from two transistor pairs less than a predetermined minimum duty cycle needed for motor current sensing to properly sample the motor current. In the same or a different example, motor operation is allowed in all four quadrants of the motor torque versus motor speed diagram.

The foregoing description of several methods of the invention has been presented for purposes of illustration. It is not intended to be exhaustive or to limit the invention to the precise forms and steps disclosed, and obviously many modifications and variations are possible in light of the above teaching. It is intended that the scope of the invention be defined by the claims appended hereto.

The invention claimed is:

1. A method for producing PWM voltage waveforms in a PWM motor controller of a PM DC brushless motor, wherein the motor has commutation states and first, second and third phases, wherein the voltage waveforms have a PWM period for each commutation state, wherein the motor controller has first, second and third half H-bridge transistor pairs to generate the voltage waveforms to electronically commutate the motor, and wherein the method comprises:
   a) always assigning the first transistor pair to the first phase for every commutation state requiring a voltage waveform from the first transistor pair;
   b) always assigning the second transistor pair to the second phase for every commutation state requiring a voltage waveform from the second transistor pair;
   c) always assigning the third transistor pair to the third phase for every commutation state requiring a voltage waveform from the third transistor pair;

d) always starting a voltage waveform generated by the first transistor pair substantially at the beginning of the PWM period for a commutation state when the commutation state requires a voltage waveform from the first transistor pair;

e) always delaying starting a voltage waveform generated by the second transistor pair by substantially ⅓ of the PWM period for the commutation state when the commutation state requires a voltage waveform from the second transistor pair; and f) always delaying starting a voltage waveform generated by the third transistor pair by substantially ⅔ of the PWM period for the commutation state when the commutation state requires a voltage waveform from the third transistor pair.

2. The method of claim 1, wherein each commutation state requires voltage waveforms from exactly two of the first, second and third transistor pairs.

3. The method of claim 2, wherein each voltage waveform has a duty cycle which can be adjusted from a first duty cycle equal to a desired duty cycle and a second duty cycle equal to a 100% duty cycle, and wherein the desired duty cycle is greater than a predetermined duty cycle required for the motor controller to sample current in the motor.

4. The method of claim 2, wherein each voltage waveform has a duty cycle which can be adjusted from a first duty cycle equal to a predetermined minimum duty cycle required for the motor controller to sample current in the motor and a second duty cycle equal to the predetermined minimum duty cycle plus a desired duty cycle, and wherein the desired duty cycle is less than the predetermined minimum duty cycle.

5. The method of claim 4, wherein the commutation states consist of rotationally sequential first, second, third, fourth, fifth and sixth commutation states, wherein the motor has a first winding for the first phase, a second winding for the second phase and a third winding for the third phase, wherein for the first commutation state the first transistor pair has a duty cycle equal to the second duty cycle, the second transistor pair has a duty cycle equal to the first duty cycle, the voltage waveform from the first transistor pair is applied to the first winding and the voltage waveform from the second transistor pair is applied, opposite in sign, to the second winding, and wherein current flows from the first winding to the second winding.

6. The method of claim 5, wherein for the second commutation state the first transistor pair has a duty cycle equal to the second duty cycle, the third transistor pair has a duty cycle equal to the first duty cycle, the voltage waveform from the first transistor pair is applied to the first winding and the voltage waveform from the third transistor pair is applied, opposite in sign, to the third winding, and wherein current flows from the first winding to the third winding.

7. The method of claim 6, wherein for the third commutation state the second transistor pair has a duty cycle equal to the second duty cycle, the third transistor pair has a duty cycle equal to the first duty cycle, the voltage waveform from the second transistor pair is applied to the second winding and the voltage waveform from the third transistor pair is applied, opposite in sign, to the third winding, and wherein current flows from the second winding to the third winding.

8. The method of claim 7, wherein for the fourth commutation state the second transistor pair has a duty cycle equal to the second duty cycle, the first transistor pair has a duty cycle equal to the first duty cycle, the voltage waveform from the second transistor pair is applied to the second winding and the voltage waveform from the first transistor pair is applied, opposite in sign, to the first winding, and wherein current flows from the second winding to the first winding.

9. The method of claim 8, wherein for the fifth commutation state the third transistor pair has a duty cycle equal to the second duty cycle, the first transistor pair has a duty cycle equal to the first duty cycle, the voltage waveform from the third transistor pair is applied to the third winding and the voltage waveform from the first transistor pair is applied, opposite in sign, to the first winding, and wherein current flows from the third winding to the first winding.

10. The method of claim 9, wherein for the sixth commutation state the third transistor pair has a duty cycle equal to the second duty cycle, the second transistor pair has a duty cycle equal to the first duty cycle, the voltage waveform from the third transistor pair is applied to the third winding and the voltage waveform from the second transistor pair is applied, opposite in sign, to the second winding, and wherein current flows from the third winding to the second winding.

11. A method for producing PWM voltage waveforms in a PWM motor controller of a PM DC brushless motor, wherein the motor has commutation states and first, second and third phases, wherein the voltage waveforms have a PWM period for each commutation state, wherein the motor controller has first, second and third half H-bridge transistor pairs to generate the voltage waveforms to electronically commutate the motor, and wherein the method comprises:

a) always assigning the first transistor pair to the first phase for every commutation state requiring a voltage waveform from the first transistor pair;

b) always assigning the second transistor pair to the second phase for every commutation state requiring a voltage waveform from the second transistor pair;

c) always assigning the third transistor pair to the third phase for every commutation state requiring a voltage waveform from the third transistor pair;

d) always starting a voltage waveform generated by the first transistor pair substantially at the beginning of the PWM period for a commutation state when the commutation state requires a voltage waveform from the first transistor pair;

e) always delaying starting a voltage waveform generated by the second transistor pair by substantially ⅓ of the PWM period for the commutation state when the commutation state requires a voltage waveform from the second transistor pair;

f) always delaying starting a voltage waveform generated by the third transistor pair by substantially ⅔ of the PWM period for the commutation state when the commutation state requires a voltage waveform from the third transistor pair; and g) operating the motor in all four quadrants of a motor torque versus motor speed diagram.

12. The method of claim 11, wherein each commutation state requires voltage waveforms from exactly two of the first, second and third transistor pairs.

13. The method of claim 12, wherein each voltage waveform has a duty cycle which can be adjusted from a first duty cycle equal to a desired duty cycle and a second duty cycle equal to a 100% duty cycle, and wherein the desired duty cycle is greater than a predetermined duty cycle required for the motor controller to sample current in the motor.

14. The method of claim 12, wherein each voltage waveform has a duty cycle which can be adjusted from a first duty cycle equal to a predetermined minimum duty cycle required for the motor controller to sample current in the motor and a second duty cycle equal to the predetermined minimum duty cycle plus a desired duty cycle, and wherein the desired duty cycle is less than the predetermined minimum duty cycle.

15. The method of claim 14, wherein the commutation states consist of rotationally sequential first, second, third, fourth, fifth and sixth commutation states, wherein the motor has a first winding for the first phase, a second winding for the second phase and a third winding for the third phase, wherein for the first commutation state the first transistor pair has a duty cycle equal to the second duty cycle, the second transistor pair has a duty cycle equal to the first duty cycle, the voltage waveform from the first transistor pair is applied to the first winding and the voltage waveform from the second transistor pair is applied, opposite in sign, to the second winding, and wherein current flows from the first winding to the second winding.

16. The method of claim 15, wherein for the second commutation state the first transistor pair has a duty cycle equal to the second duty cycle, the third transistor pair has a duty cycle equal to the first duty cycle, the voltage waveform from the first transistor pair is applied to the first winding and the voltage waveform from the third transistor pair is applied, opposite in sign, to the third winding, and wherein current flows from the first winding to the third winding.

17. The method of claim 16, wherein for the third commutation state the second transistor pair has a duty cycle equal to the second duty cycle, the third transistor pair has a duty cycle equal to the first duty cycle, the voltage waveform from the second transistor pair is applied to the second winding and the voltage waveform from the third transistor pair is applied, opposite in sign, to the third winding, and wherein current flows from the second winding to the third winding.

18. The method of claim 17, wherein for the fourth commutation state the second transistor pair has a duty cycle equal to the second duty cycle, the first transistor pair has a duty cycle equal to the first duty cycle, the voltage waveform from the second transistor pair is applied to the second winding and the voltage waveform from the first transistor pair is applied, opposite in sign, to the first winding, and wherein current flows from the second winding to the first winding.

19. The method of claim 18, wherein for the fifth commutation state the third transistor pair has a duty cycle equal to the second duty cycle, the first transistor pair has a duty cycle equal to the first duty cycle, the voltage waveform from the third transistor pair is applied to the third winding and the voltage waveform from the first transistor pair is applied, opposite in sign, to the first winding, and wherein current flows from the third winding to the first winding.

20. The method of claim 19, wherein for the sixth commutation state the third transistor pair has a duty cycle equal to the second duty cycle, the second transistor pair has a duty cycle equal to the first duty cycle, the voltage waveform from the third transistor pair is applied to the third winding and the voltage waveform from the second transistor pair is applied, opposite in sign, to the second winding, and wherein current flows from the third winding to the second winding.

21. A method for producing PWM voltage waveforms in a PWM motor controller of a PM DC brushless motor, wherein the motor has commutation states and first, second and third phases, wherein the voltage waveforms have a PWM period for each commutation state, wherein the motor controller has first, second and third half H-bridge transistor pairs to generate the voltage waveforms to electronically commutate the motor, and wherein the method comprises:

a) always assigning the first transistor pair to the first phase for every commutation state requiring a voltage waveform from the first transistor pair;

b) always assigning the second transistor pair to the second phase for every commutation state requiring a voltage waveform from the second transistor pair;

c) always assigning the third transistor pair to the third phase for every commutation state requiring a voltage waveform from the third transistor pair;

d) always starting a voltage waveform generated by the first transistor pair substantially at the beginning of the PWM period for a commutation state when the commutation state requires a voltage waveform from the first transistor pair;

e) always delaying starting a voltage waveform generated by the second transistor pair by substantially $\frac{1}{3}$ of the PWM period for the commutation state when the commutation state requires a voltage waveform from the second transistor pair;

f) always delaying starting a voltage waveform generated by the third transistor pair by substantially $\frac{2}{3}$ of the PWM period for the commutation state when the commutation state requires a voltage waveform from the third transistor pair; and g) operating the motor in all four quadrants of a motor torque versus motor speed diagram, wherein each commutation state requires voltage waveforms from exactly two of the first, second and third transistor pairs, wherein each voltage waveform has a duty cycle which can be adjusted from a first duty cycle equal to a predetermined minimum duty cycle required for the motor controller to sample current in the motor and a second duty cycle equal to the predetermined minimum duty cycle plus a desired duty cycle, and wherein the desired duty cycle is less than the predetermined minimum duty cycle, and wherein for each commutation state the voltage waveform of one of the two transistor pairs has a duty cycle equal to the second duty cycle and the other of the two transistor pairs has a duty cycle equal to the first duty cycle.

22. The method of claim 21, wherein the motor has a winding for each phase, wherein the voltage waveform of the one transistor pair is applied to one winding when a commutation state requires a voltage waveform from the one transistor pair, wherein the voltage waveform of the other transistor pair is applied, opposite in sign, to an other winding when a commutation state requires a voltage waveform from the other transistor pair, and wherein current flows from the one winding to the other winding.

\* \* \* \* \*